United States Patent [19]

Davis

[11] 4,199,891

[45] Apr. 29, 1980

[54] STABILIZED TROLLING PLANER

[76] Inventor: Walter H. Davis, 1222 Maiden La., Columbia, S.C. 29205

[21] Appl. No.: 899,307

[22] Filed: Apr. 24, 1978

[51] Int. Cl.² ............................................. A01K 91/06
[52] U.S. Cl. ................................................... 43/43.13
[58] Field of Search ................. 43/42.03, 42.22, 42.23, 43/42.49, 43.13

[56] References Cited

U.S. PATENT DOCUMENTS

| | | | |
|---|---|---|---|
| 3,140,555 | 7/1964 | Gross | 43/43.13 |
| 3,466,787 | 9/1969 | Collins | 43/43.13 |
| 3,667,148 | 6/1972 | Dawson | 43/43.13 |
| 3,708,904 | 1/1973 | Zaharis | 43/43.13 |
| 3,835,573 | 9/1974 | Borchardt | 43/43.13 |
| 4,128,959 | 12/1978 | Staaden | 43/43.13 |

*Primary Examiner*—Nicholas P. Godici
*Attorney, Agent, or Firm*—Bailey, Dority & Flint

[57] ABSTRACT

A trolling planer for submerging a fishing line is disclosed having a planing body supported by a wire frame and a stabilizer member connected between the planing body and the wire frame restraining relative movement and securing connection therebetween.

9 Claims, 3 Drawing Figures

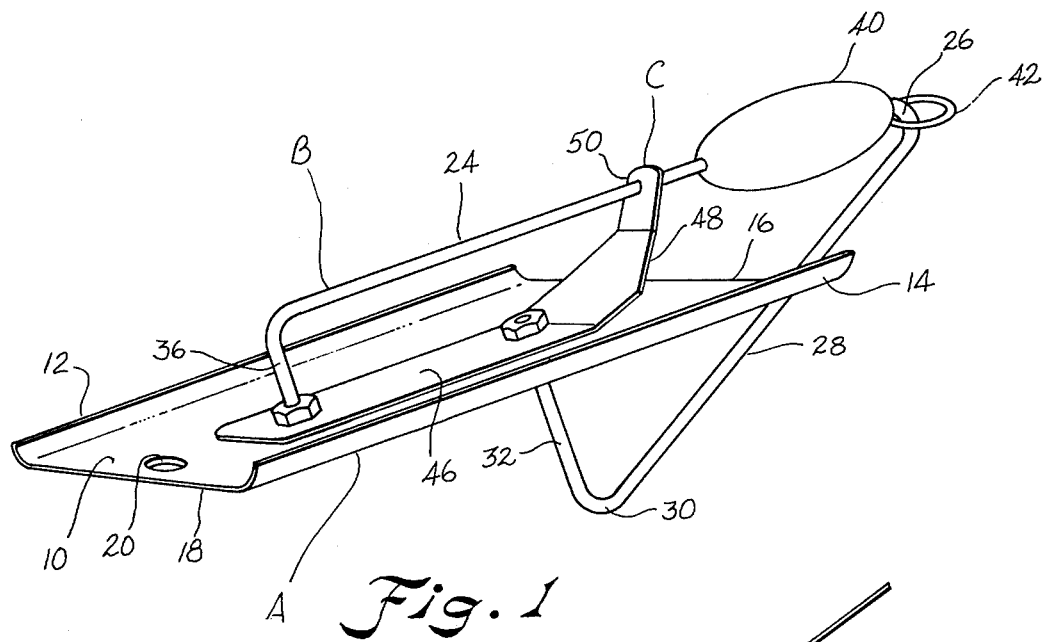
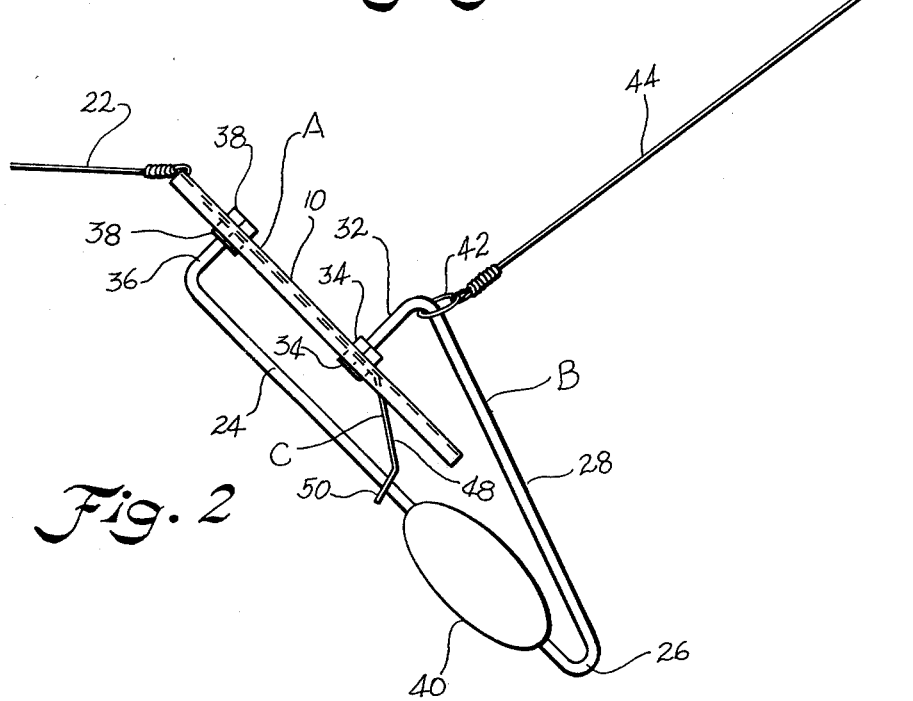
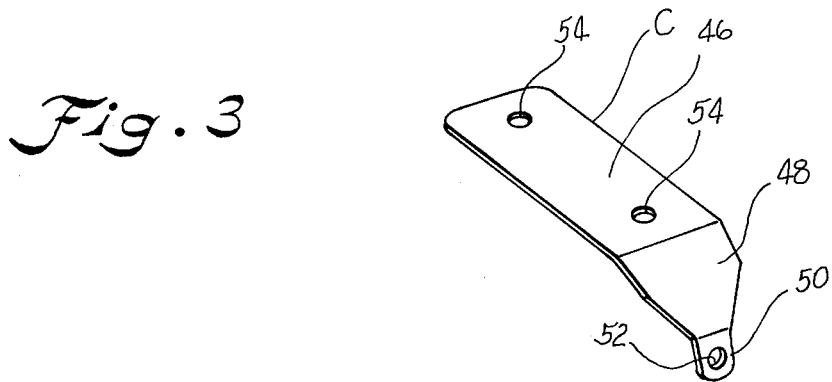

STABILIZED TROLLING PLANER

BACKGROUND OF THE INVENTION

Devices have been previously developed for submerging a fishing line during trolling operations which typically include a planing body supported on a wire frame and a weight positioned on the wire frame below the level of the planing body. A ring is slidably carried on the wire frame for connection to a fishing line and when the ring is positioned in a bend of the wire frame, the trolling planer dives in the water carrying the fishing line and hook line downwardly to a desired depth. When a fish strikes the hook line, the ring slides to a front bend of the wire frame allowing the trolling planer to come to the surface of the water.

The wire frame is typically attached to the planing body by means of two free legs having threaded ends secured in longitudinally spaced openings in the planing body by means of nuts tightened on opposite sides of the planing body. In other instances, the legs of the wire frame may be affixed to the planing body such as by welding. Due to the planing device being occasionally dropped and to the wobbling vibratory type action of the trolling planer when in the water, the problem occurs that the nuts which affix the threaded legs of the wire frame become loosened. This results in increasing relative twisting movement between the wire frame and planing body and increasing wobbling vibrations of the trolling planer when in the water eventually leading to complete separation of the nuts and loss of the planing troller. Furthermore, with the nuts loosened, relative movement between the wire frame and planing body results in the loss of proper alignment therebetween. Misalignment tends to cause the trolling planer to run to the side and flip to the surface in use.

Accordingly, an important object of the present invention is to provide an improved trolling planer for submerging a fishing line of the type having a planing body supported on a wire frame wherein a stabilizer means is provided to restrain relative movement between the wire frame and the planing body.

Another important object of the present invention is to provide a trolling planer of the type having a planing body supported by a wire frame wherein the connection therebetween is stabilized so as to maintain the alignment therebetween.

SUMMARY OF THE INVENTION

It has been found that a trolling planer can be constructed according to the invention of the type having a planing body supported by a wire frame wherein stabilized connection between the wire frame and planing body may be provided by a brace member interconnecting said planing body and wire frame which restrains relative movement maintaining secure connection and alignment therebetween.

BRIEF DESCRIPTION OF THE DRAWINGS

The construction designed to carry out the invention will be hereinafter described, together with other features thereof.

The invention will be more readily understood from a reading of the following specification and by reference to the accompanying drawing(s) forming a part thereof, wherein an example of the invention is shown and wherein:

FIG. 1 is a perspective view of a trolling planer device in an upside-down position illustrating the stabilized construction according to the present invention;

FIG. 2 is a side elevational view illustrating a trolling planer device constructed in accordance with the present invention; and FIG. 3 is a perspective view illustrating a stabilizing brace member for use in the improved trolling planer according to the present invention.

DESCRIPTION OF A PREFERRED EMBODIMENT

The drawing illustrates a trolling planer device having a planing body A supported by a wire frame means B having a weight carried thereon and being of a generally angular configuration including two free legs which are affixed to the planing body A at two longitudinally spaced points. A stabilizer means C is connected between the planing body A and wire frame B to restrain relative movement and maintain alignment therebetween.

Referring now in more detail to the drawing, it can be seen that the planing body A includes a flat generally rectangular plate 10 having downwardly curved side edges 12 and 14 and straight front and rear edges 16 and 18. An eyelet 20 is provided in the rear of the planing body affording connection to a trailing portion 22 of the fishing line which carries the fish hook or lure.

The wire frame B which supports the planing body A in the water includes a wire frame which is bent in an angular configuration and includes a leg 24 parallel to the flat plate 10 which terminates in a bend 26 and an inclined leg 28 extending from the bend 26 terminating at a bend 30. The wire frame B further includes a first free leg 32 extending from the bend 30 toward the top of the plate 10 having a threaded end extending through an aperture in the plate 10 and affixed thereto by means of nuts 34 which are tightened on opposing sides of the plate 10. A second free leg 36 is bent from the parallel leg 24 and extends toward the bottom side of the flat plate 10 having a threaded end extending through an aperture in the plate and secured therein by means of a pair of nuts 38 tightened on opposing sides of the plate. A weight 40 is carried on the wire frame B and may be affixed thereto by any suitable means such as molding the weight thereon in a suitable jig. A ring 42 is carried on the wire frame B and provides a means of connection to a portion 44 of the fishing line which extends from the planing device to an associated rod and reel.

It will be noted that the legs 32 and 36 are affixed to the planing body A at two longitudinally spaced points on the body. As in the illustrated embodiment, the wire frame is typically affixed to the planing body by means of threaded wire ends and nuts which requires formation of holes at the two longitudinally spaced points. It is important that the wire frame B is aligned with the center of the plate 10 and, therefore, that the openings formed therein are spaced along the center axis of the flat plate. If the wire frame and planing body are not in proper alignment after the nuts securing the wire frame to the plate have been tightened, the trolling planer will operate in an unstable manner during use resulting in increased vibrations in the fishing line and in the planer running to the side. According to the present invention, proper alignment is virtually assured during and after nut tightening.

As illustrated in FIG. 3, the stabilizer means C is provided by a brace member including a flat attachment flange 46 carried adjacent the bottom side of the flat plate 10 and a downwardly tapering tab 48 integral therewith which terminates in a tip end portion 50 having an aperture 52 formed therein for making connection with the wire frame B by receiving the parallel leg 24 therethrough. It is noted that two holes 54 are formed in the flange portion 46 of the brace and are longitudinally spaced so as to coincide and be in alignment with the holes formed in the flat plate 10 for receiving legs 32 and 36. Thus, the stabilizing brace member C of the plate 10, and the wire frame B are unitarily tightened and connected together by means of the affixing nuts 34 and 38.

By longitudinally carrying the brace between the two points of attachment of legs 32 and 36, twisting movement of the wire frame relative to the planing body at these two points is effectively reduced, reducing the tendency of the nuts to loosen. With the leg 24 of the wire frame extending through the tip 50 of the brace, twisting motion about the two spaced points and any other relative movement between the wire frame B and the planing body A is effectively restrained. Furthermore, not only does the stabilizing means C restrain relative movement between the wire frame B and the planing body A, but the brace maintains the wire frame B in proper alignment during tightening of the nuts 35 and 36 and thereafterwards.

Thus, not only does the stabilizing brace maintain proper alignment of the wire frame during use, but assures initial proper alignment during fabrication and during hand tightening of the nuts. Thereafterwards, any relative movement is restrained, particularly, that which causes the legs 32 and 36 to twist about their respective points of attachment which causes the nuts 35 and 38 to loosen.

It can be seen that a highly advantageous construction for a trolling planer can be had according to the present invention wherein stabilized connection between the planing body and its supporting wire frame is provided avoiding the disconnection and misalignment therebetween.

While a preferred embodiment of the invention has been described using specific terms, such description is for illustrative purposes only, and it is to be understood that changes and variations may be made without departing from the spirit or scope of the following claims.

What is claimed is:

1. In a trolling planer of the type having a planing body, wire frame means connected to said planing body having weight means carried thereon and adapted for connection with a fishing line, said wire frame having an angular configuration including two free legs affixed to said planing body at two longitudinally spaced points, and means affixing said free legs to said planing body, the improvement comprising:
stabilizer means connected between said planing body and said wire frame restraining relative movement therebetween, and
said stabilizer means being connected to said planing body at two longitudinally spaced points along the longitudinal axis of said planing body and to a third point on said wire frame.

2. The structure of claim 1 wherein said stabilizer means includes an elongated brace member having a flat portion carried adjacent said planing body and an inclined tab portion connected to said wire frame.

3. The structure of claim 1 wherein said two longitudinally spaced points at which said free legs of said wire frame are affixed coincide with said two longitudinally spaced points at which said stabilizer means is connected to said planing body.

4. In a trolling planer of the type having a planing body, a wire frame connected to said planing body adapted for connection to a fishing line, a weight positioned on said wire frame, said wire frame having an angular configuration including two free legs affixed to said planing body at two longitudinally spaced points, and means affixing said free legs to said planing body, the improvement comprising an elongated brace member extending longitudinally along the longitudinal axis of said planing body, said brace member interconnecting said planing body and said wire frame affording restraint against twisting movement therebetween.

5. The structure of claim 4 wherein said elongated brace member is carried longitudinally by said planing body by attaching said brace member to said planing body at said longitudinally spaced points by utilizing said affixing means which affixes said free legs of said wire frame to said planing body.

6. The structure of claim 5 wherein said brace member includes a downwardly extending end portion connected with said wire frame.

7. The structure of claim 4 wherein said elongated brace member includes a flange connected at longitudinally spaced points to said planing body and an inclined tip portion connected to a leg of said wire frame.

8. In a trolling planer of the type having a planing body, wire frame means supporting said planing body having weight means carried thereon and adapted for connection with a fishing line, said wire frame having an angular configuration including two free legs affixed to said planing body at two longitudinally spaced points, and means affixing said free legs to said planing body, the improvement comprising:
stabilizer means carried by said planing body interconnecting said two longitudinally spaced points and attached thereto by said affixing means restraining relative movement between said planing body and said wire frame.

9. The structure of claim 1 wherein said stabilizer means includes an elongated brace means having a flat portion with longitudinally spaced openings formed therein for receiving the free ends of said two free legs when attached to said planing body and an inclined tab portion connected to said wire frame.

* * * * *